E. D. CARTER.
AUTOMATIC WEIGHING SCALE.
APPLICATION FILED APR. 9, 1913.
1,100,120.
Patented June 16, 1914.
2 SHEETS—SHEET 1.
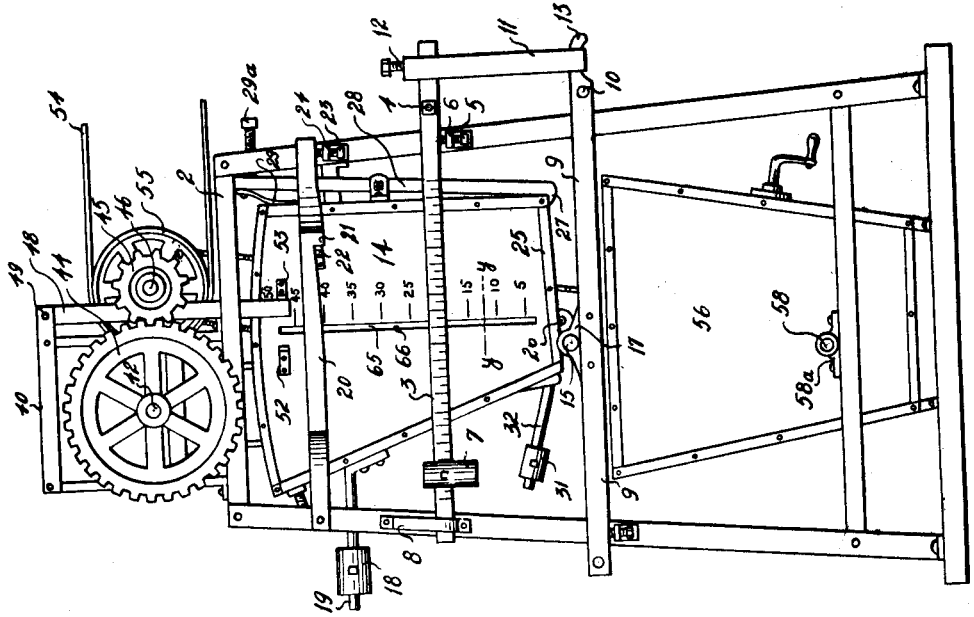
WITNESSES:
J. C. Ledbetter
J. S. Murray
INVENTOR
E. D. Carter
BY
John M. Spellman
ATTORNEY E. D. CARTER.
AUTOMATIC WEIGHING SCALE.
APPLICATION FILED APR. 9, 1913.
1,100,120.
Patented June 16, 1914.
2 SHEETS—SHEET 2.
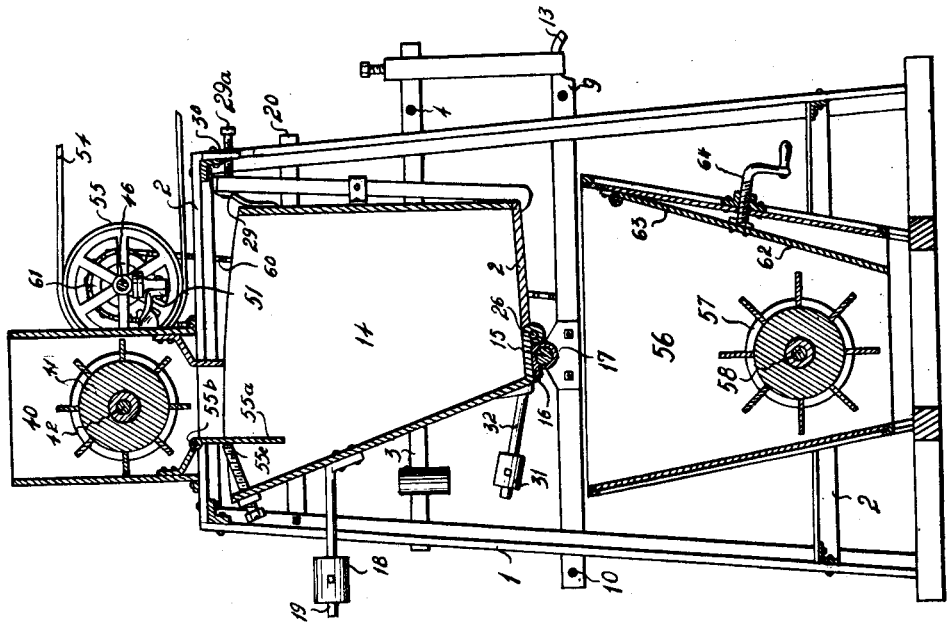
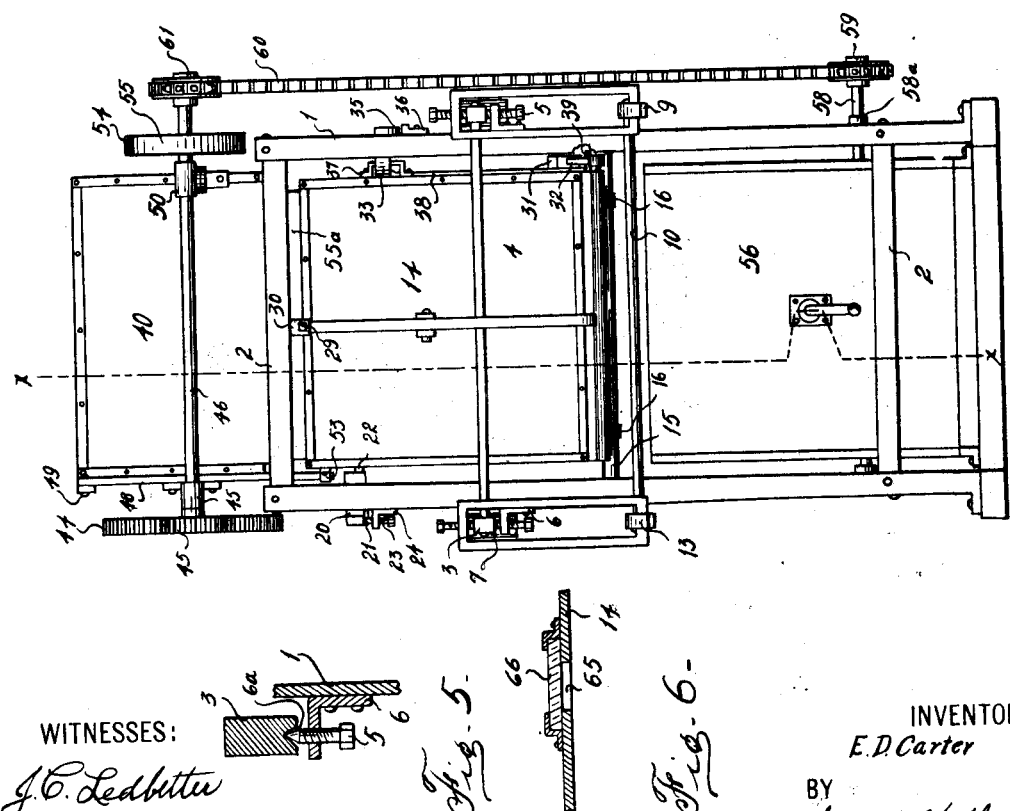
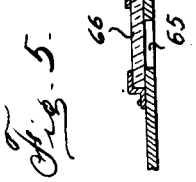
WITNESSES:
J. C. Ledbetter
J. S. Murray
INVENTOR
E. D. Carter
BY
John M. Spellman
ATTORNEY

UNITED STATES PATENT OFFICE.

EDWARD D. CARTER, OF DALLAS, TEXAS.

AUTOMATIC WEIGHING-SCALE.

1,100,120.

Specification of Letters Patent. Patented June 16, 1914.

Application filed April 9, 1913. Serial No. 759,844.

*To all whom it may concern:*

Be it known that I, EDWARD D. CARTER, a citizen of the United States, residing at Dallas, in the county of Dallas and State of Texas, have invented certain new and useful Improvements in Automatic Weighing-Scales, of which the following is a specification.

My invention relates to improvements in automatic weighing scales, and relates more particularly to certain improvements upon the construction covered by Letters Patent Number 1,011,575 issued to me December 12, 1911.

The object of the invention is to provide a weighing scale, entirely automatic in operation, which will be adapted for continually weighing material in bulk, such as cotton-seed, wheat, meal, et cetera, the flow of said material into the scale receiver being discontinued only at short periodic intervals, during which a known weight of the material is being discharged from the receiver.

Another object of the invention is to provide an auxiliary receiver, into which the weighing receiver will periodically discharge its contents, and to mount within the auxiliary receiver, a feed wheel that will discharge the material at a gradual and constant rate, so that it may be received and carried off by a conveyer.

Still another object is to provide a feed-wheel within the chute through which material is fed into the main receiver of the scales, so as to overcome any tendency of the material to become so packed as to interrupt the flow.

A further object is to simultaneously stop the rotation of the last described feed-wheel and close the said chute, when a predetermined weight of material has accumulated in the main receiver.

A still further object is to provide a means for determining to a close approximation, the weight of material in the receiver, when this weight is less than that which the scale is adjusted to continuously weigh, so that the main receiver has discharged a certain number of full loads, the final discharge may be limited to such a weight as is necessary to give a certain desired total.

Finally the object of the invention is to provide a device of the character described, that will be strong, durable, simple, and efficient, and also one the various parts of which will not be likely to get out of working order.

With these and various other objects in view, my invention has relation to certain novel features of the construction and operation, an example of which is described in the following specification and illustrated in the accompanying drawings, wherein:

Figure 1 is a side elevation of a weighing scale, in which are embodied the novel features which constitute my invention. Fig. 2 is an elevation of the other side of the machine. Fig. 3 is a front view. Fig. 4 is a sectional elevation, the section being taken upon the line $x$—$x$ of Fig. 3. Fig. 5 is a detail sectional view of a certain pivot bearing embodied in my invention, the section being taken upon the line $x$—$x$ of Fig. 1. Fig. 6 is a sectional view of another detail of construction the section being taken upon the line $y$—$y$ of Fig. 2.

Referring now more particularly to the drawings, wherein like reference characters designate similar parts in all of the figures, the numeral 1 denotes the four upright corner members of the open frame-work, in which the mechanism of the weigning scale is supported, and 2 denotes the horizontal members of the frame-work, positioned at each side thereof, one at the top and one in the lower portion. The members 1 and 2 will preferably have the form of angle bars, and the structure which they comprise will hereinafter be referred to as the supporting frame.

A pivoted frame, consisting of two normally horizontal scale beams 3, and a rod 4 rigidly connecting the front ends of said beams, is mounted upon the upper portion of the supporting frame, the beams 3 being respectively mounted at each side of the machine. The pivotal supporting means consists in a pair of pointed screws 5 mounted in brackets 6 respectively secured to the front members 1, the pointed upper ends of said screws being provided with conical sockets 6ª in the forward ends of said beams, as is best shown in Fig. 5. The two scale beams are similarly graduated, and respectively carry slidably adjustable weights 7. The rear ends of the two scale beams are provided with keepers 8 respectively mounted upon the two rear members 1, to limit the angular displacement which the beams may undergo. Spaced some distance beneath the frame formed by the members 3 and 4, there is mounted a second pivoted frame, comprising two normally horizontal bars 9, and a pair of rods 10 rigidly connecting the extremities of said rods. The means for supporting the frame including the bars 9 is identical with that supporting the frame which includes the scale beams, except that in the first case the pivotal supports are mounted upon the two rear members 1. Thus the pivoted rear end of the lower frame lies beneath the free end of the upper frame, while the free forward end of the lower frame is disposed beneath the pivoted end of the upper frame. The forward extremities of the members 3 and 9 project a short distance beyond the supporting frame, and a connection is established between the same by a pair of links 11 having adjusting screws 12 mounted in their upper ends and socketed in the correlated beams, the free ends of the bars 9 being formed with slight hooks 13 resting in the lower ends of said links. Thus there is established a swinging connection between the forward ends of the two pivoted frames, this connection being such that both frames will be subjected to an angular displacement when a load sufficient to counter-balance the weights 7 comes upon the lower pivoted frame, the amount of angular displacement being limited by the keepers 8. By adjusting the positions of the weights 7, according to the graduations of the scale beams, the weight which must come upon the lower pivoted frame to produce angular displacement thereof may be accurately regulated.

Upon the bars 9 is pivotally supported an oscillatory open topped receiver 14, the supporting means consisting in a rock-shaft 15, rigidly secured to the bottom of the receiver by straps 16, and having its extremities journaled in bearings 17, one of which is centrally mounted upon each of the bars 9. The receiver 14 occupies almost the entire upper portion of the supporting frame, and is pivoted somewhat to the rear of its center of gravity so that a preponderance of the weight of the receiver and its contents must lie in front of the pivotal axis, giving the receiver a tendency to swing forward. This tendency is overcome, when the receiver is empty, by a weight 18 mounted upon an arm 19 projecting rigidly from the rear wall of the receiver, said weight serving to automatically return the receiver to its rearmost limiting position, after having been emptied. The receiver will preferably be formed of sheet metal, although any other suitable material may be employed.

When the receiver 14 is being filled, it is tilted to its rearmost limiting position of angular displacement, and when it is discharging its contents it lies in its forward limiting position. As the material gradually accumulates in the receiver, while the same is being filled, there arises a constantly increasing tendency toward forward displacement, owing to the preponderance of weight in front of the pivotal axis. In order to prevent such a motion during filling a locking means is provided consisting of a normally horizontal bar 20, mounted upon the upper portion of the supporting frame at one side thereof, the rear end of said bar being pivoted upon one of the rear members 1, and the lower edge of the bar being formed with a shoulder 21, against which bears an angular bracket 22 secured to the adjacent side of the hopper. The free end of the bar 20 rests upon an adjusting screw 23 mounted in a bracket 24 secured to one of the front members 1. When a predetermined weight of material has accumulated in the receiver, causing it to undergo a slight downward displacement, the bracket 22 will be freed from the shoulder 21 and the receiver will at once swing to its forward limiting position.

A description will now be given of a mechanism for automatically opening the receiver door 25, when the receiver has been shifted forwardly and a device for closing said door when the receiver has discharged its contents. The door 25 is hinged upon a pintle 26, and when in its closed position, is adapted to be engaged at its free edge by a latch head 27 carried by the lower end of an upright latch bar 28, centrally pivoted upon the front wall of the receiver. A spring 29, mounted upon the upper end of the receiver bears upon the adjacent receiver wall, and causes the latch-head 27 to immediately engage the door 25 as soon as the latter is closed. When the receiver, after having been filled, is displaced to its forward position, the upper end of the bar 28 comes into contact with a screw 29ª, mounted in a bracket 30 depending from the top bar 2 at the front of the machine. The loaded receiver presses the bar 28 against the screw 29ª with sufficient force to overcome the resistance of the spring 29, and said bar is consequently subjected to an angular displacement shifting its lower end outward from the receiver and releasing the door 25. The weight of material resting upon said door will then immediately throw the same open, permitting the receiver to discharge its contents. In order to automatically close the door 25, when the receiver has discharged, a counterweight 31 is mounted fast upon an arm 32 projecting rigidly from the pintle 26 toward the front of the machine.

A mechanism will now be described, which holds the receiver steady in its forward position while discharging, and is automatically released from engagement with the receiver when the latter has been completely emptied.

Upon that side of the machine that is shown in Fig. 1, there is pivotally mounted a substantially horizontal latch bar 33, the pivotal connection with the receiver being indicated at 34. The forward extremity of the bar 33 is formed with a latch head 35 adapted to engage an angular bracket 36 mounted upon the adjacent member 1. The angular displacement of the bar 33 about the pivot 34 is limited by a keeper 37 secured to the receiver, the displacement permitted being only sufficient to permit the latch head 35 to be engaged with or disengaged from the bracket 36. As the loaded receiver tilts to its forward limiting position, the latch head 35 automatically enters into engagement with the bracket 36, and maintains this engagement until the receiver has discharged its contents. From the rear end of the bar 33 there depends an arm 38, having its lower end bent outwardly from the receiver as indicated at 39. The bent lower end of the arm 38 is so disposed that the arm 32 will contact with the portion 39 of the arm 38 just before the door 25 reaches its closed position. The arm 38 will thus be subjected to a slight downward displacement producing a sufficient pivotal movement of the bar 33 to disengage the latch head 35 from the bracket 36. The empty receiver will then immediately tilt to its rearward limiting position due to the weight 18, and as this displacement takes place, the bracket 22 will slightly raise the bar 20. As the receiver reaches its rearward limiting position, the bracket 22 passes the shoulder 21, thus permitting the bar 20 to drop to its normal position, in which the receiver is locked against forward displacement. On top of the supporting frame, there is mounted a rectangular chute 40, through which material may be discharged into said receiver. Within said chute, a feed-wheel 41 is mounted fast upon a shaft 42 transverse of the machine, the extremities of said shaft being passed through the side walls of the chute and journaled in bearings 43. Upon one end of the shaft 42, there is mounted a large gear 44, adapted to mesh with a pinion 45 fast upon a shaft 46 mounted adjacent to the front wall of the chute. That extremity of the shaft 46 which carries the pinion 45 is journaled in a bearing 47, mounted upon the intermediate portion of an upright bar 48, pivoted as indicated at 49 upon the upper front portion of the chute. The bar 48 is adapted to undergo a slight angular displacement about the pivot point 49, sufficient to bring the pinion 45 into or out of engagement with the gear 44, the manner and purpose of producing such a displacement being hereinafter made clear. The other extremity of the shaft 46 is journaled in a bearing 50 pivoted upon a bracket 51 secured to the receiver, the pivotal axis being vertical.

The lower end of the bar 48 projects between two spaced angular brackets 52 and 53, said bracket being so disposed with relation to said bar that the bracket 52 will contact with the bar when the receiver is tilting forward, causing the pinion 45 to be disengaged from the gear 44 just before the receiver reaches its forward limiting position. Similarly the bracket 53 will shift the bar 48 rearwardly and bring the pinion 45 into mesh with the gear 44 just before the receiver reaches its rearward limiting position. A constant rotation will be communicated to the shaft 46 from any suitable source of power through a belt 54, engaging a pulley 55 fast upon said shaft. It is apparent from the foregoing explanation that the feed-wheel 41 will revolve while the receiver is being filled and will remain still while the receiver is being emptied.

When the feed-wheel 41 is still, there will possibly be a very slight flow of material between said feed-wheel and the receiver walls, if the material weighed is fine grained. To prevent this small quantity of material from entering the receiver while the latter is discharging, a door 55$^a$, hinged transversely of the machine as indicated at 55$^b$, is provided to the bottom of the chute 40 said door being automatically closed as the receiver swings forwardly, by a screw 55$^c$ mounted at the top of the rear wall of the receiver. As the receiver is returned to its forward limiting position, the screw 55$^c$ releases the door 55$^a$ permitting the latter to swing open as shown in Fig. 4. Thus after the receiver has been loaded, no excess of material can be discharged into it, until it has been emptied of its load.

The lower portion of the supporting frame is occupied by an auxiliary receiver 56, having its top and bottom open and having its front and back walls inclined somewhat toward each other from top to bottom. The auxiliary receiver has a rigid relation to the supporting frame and is so disposed as to receive the discharge from the main receiver. Within the lower portion of the auxiliary receiver, there is mounted a feed-wheel 57 fast upon a shaft 58 transverse of the machine, having its extremities passing respectively through the side walls of the auxiliary receiver and journaled in bearings 58$^a$ respectively mounted upon the lower side frame members 2. One extremity of the shaft 58 is made to project slightly outward beyond the correlated bearings to receive a sprocket wheel 59. Rotation may be communicated to said sprocket wheel and the shaft upon which it is fast from the shaft 46 by a chain 60 engaging the sprocket wheel 59 at its lower end and engaging at its upper end a sprocket wheel 61 fast upon one end of the shaft 46. The feed-wheel 57 is mounted sufficiently close to the rear wall of the receiver 56 that no material can be discharged between said feed wheel and said wall. At the front of the receiver, in addition to the stationary exterior wall, there is provided an adjustable interior wall 62, said wall being hinged at its upper end as indicated at 63. An adjusting screw 64 formed at its outer end with a crank and handle is mounted in the stationary front wall of the receiver, the rear end of said screw being made to bear against the adjustable wall 62 so as to regulate the position of said wall relative to the feed-wheel 57. According as the wall 62 is adjusted to or from the feed-wheel 57, the flow of material from the auxiliary receiver will be more or less gradual. Thus there is avoided the possibility of the auxiliary receiver discharging its contents so rapidly that the conveyer provided to remove the discharged material will become clogged or choked.

Occasion will at times arrive to discharge from the main receiver a load less than that which the machine is adjusted to continuously weigh. A description will now be given of a provision made for accurately estimating the amount of this partial load without shifting the weights 7.

In one of the side walls of the receiver 14, there is formed an elongated vertical slot 65, said slot being closed by a suitable strip of glass 66 mounted against said wall within the receiver. Upon the exterior face of the receiver wall in which said slot is formed, there are marked scale lines and corresponding numerals, indicating the weight of material contained in the receiver, when the receiver is filled to the height of these scale lines.

A brief description will now be given relating entirely to the automatic operation of the weighing scale.

The machine will be set up beneath some large receptacle in which is stored the material to be weighed, the chute 40 being in communication with said receptacle. As the material being weighed flows through said chute, the rotating feed-wheel 41 will eliminate any possibility of the material becoming packed in said chute. When a sufficient weight of material has accumulated in the receiver 14 to counter balance the weights 7, the receiver will undergo a slight downward displacement, causing the lower pivoted frame to swing downward about its pivotal axis and the upper pivotal frame to swing upward. The beams 3 are graduated in units, indicating pounds or some other suitable unit of weight, and by properly adjusting said weights, the charge which accumulates in the receiver may be varied within any reasonable limit. The adjustment of the two weights will preferably be such that one of them will serve to counter balance the weight of the receiver, and the other will counter balance the weight of material which accumulates in the receiver. The slight downward movement of the receiver 14 just mentioned will free the bracket 22 from the shoulder 21 in the bar 20 and the receiver may then tilt to its forward limiting position due to the preponderance of weight in front of its pivotal axis. This oscillatory movement of the receiver brings the upper end of the bar 28 into contact with the pin 29 displacing said end of said bar rearwardly and producing a pivotal movement of the bar by which the door 25 is released from the latch head 27. The door 25 then swings open due to the weight of material resting upon it and the receiver discharges its contents into the auxiliary receiver 56. The latch head 35 engaging the bracket 36 holds the receiver 14 stationary in its forward limiting position until the receiver has been completely emptied. The closing of the receiver door then releases the bracket 36 from the latch head 35 due to the weight arm 32 falling upon the lower end of the arm 38. While the main receiver is being filled, the auxiliary receiver will be discharging its load, and the wall 62 will be so adjusted that the auxiliary receiver will be completely emptied of any load before receiving another load.

The invention is presented as including all such modifications and changes as may be included within the scope of the following claims.

What I claim is:

1. The combination of a support, a balanced weighing receiver mounted in the support, a feed chute mounted over the receiver, a feed wheel mounted in the chute, a discharge receptacle mounted in the support under the receiver, a discharge wheel mounted in the discharge receptacle, and means for driving the wheels.

2. The combination of a support, a balanced weighing receiver mounted in the support, a feed chute mounted over the receiver, a feed wheel mounted in the chute, a discharge receptacle mounted in the support under the receiver, a discharge wheel mounted in the discharge receptacle, means for driving the wheels, and means actuated by the receiver for interrupting the transmission of motion to the feed wheel of the chute.

3. The combination of a support, a balanced weighing receiver mounted in the support, a feed chute mounted over the receiver, a feed wheel mounted in the chute, a discharge receptacle mounted in the support under the receiver, a discharge wheel mounted in the discharge receptacle, means for driving the wheels, and means for proportioning the discharge of the discharge receptacle with relation to the discharge of the chute, said means having provision for increasing the discharge of the discharge receptacle.

4. The combination of a support, a balanced weighing received mounted in the support, a feed chute mounted over the receiver, a discharge wheel mounted in the chute, a discharge receptacle mounted under the receiver, a discharge wheel mounted in the discharge receptacle, and a driving connection between said discharge wheels, said wheels having equal discharge capacities.

5. The combination of a support, a balanced weighing receiver mounted in the support, a feed chute mounted over the receiver, a discharge wheel mounted in the chute, a discharge receptacle mounted under the receiver, a discharge wheel mounted in the discharge receptacle, a driving connection between said discharge wheels, said wheels having equal discharge capacities, and means correlated with the discharge receptacle and the wheel thereof for varying the discharge of the discharge receptacle.

6. The combination of a support, a balanced weighing receiver mounted in the support, a feed chute mounted over the receiver, a discharge wheel mounted in the chute, a discharge receptacle mounted under the receiver, a discharge wheel mounted in the discharge receptacle, a driving connection between said discharge wheels, said wheels having equal discharge capacities, and an adjustable false wall mounted in the discharge receptacle adapted to vary the capacity thereof.

In testimony whereof I have signed my name to this specification in the presence of two subscribing witnesses.

EDWARD D. CARTER.

Witnesses:
J. S. MURRAY,
J. R. G. WILLIAMS.